US010811877B2

(12) United States Patent
Yamada

(10) Patent No.: US 10,811,877 B2
(45) Date of Patent: Oct. 20, 2020

(54) POWER SUPPLY SYSTEM AND POWER SUPPLY APPARATUS

(71) Applicant: FUJI ELECTRIC CO., LTD., Kanagawa (JP)

(72) Inventor: Ryuji Yamada, Hachioji (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 148 days.

(21) Appl. No.: 15/959,308

(22) Filed: Apr. 23, 2018

(65) Prior Publication Data

US 2018/0358807 A1 Dec. 13, 2018

(30) Foreign Application Priority Data

Jun. 8, 2017 (JP) ................................ 2017-113583

(51) Int. Cl.
*H02J 3/12* (2006.01)
*H02J 9/04* (2006.01)
*H02J 9/00* (2006.01)
*H02J 1/10* (2006.01)

(52) U.S. Cl.
CPC ................ *H02J 3/12* (2013.01); *H02J 1/102* (2013.01); *H02J 9/005* (2013.01); *H02J 9/04* (2013.01); *H02J 1/106* (2020.01)

(58) Field of Classification Search
CPC .... H02J 3/12; H02J 1/102; H02J 9/005; H02J 9/04
USPC ........................................................ 700/298
See application file for complete search history.

(56) References Cited

U.S. PATENT DOCUMENTS

| 7,394,674 | B2 * | 7/2008 | Huang ............................. 363/65 |
| 2015/0012151 | A1 * | 1/2015 | Park ........................ G05B 15/02 |
| | | | 700/298 |
| 2016/0006242 | A1 | 1/2016 | Yamada et al. |
| 2017/0117715 | A1 * | 4/2017 | Muccini et al. .......... H02J 5/00 |

FOREIGN PATENT DOCUMENTS

WO WO2015015570 A1 2/2015

OTHER PUBLICATIONS

All About Circuits, DC Circuit Equations and Laws, Chapter 1; Dec. 2015; allaboutcircuits.com, revision Dec. 6, 2015; retrieved from https://web.archive.org/web/20151206143942/https://www.allaboutcircuits.com/textbook/reference/chpt-1/dc-circuit-equations-laws on Nov. 24, 2019 (Year: 2015).*
Russell, Paralelling power supplies: Many viable options, but know the tradeoffs; Feb. 2016; EDN network; retrieved from https://www.edn.com/design/power-Management/4441523/Paralleling-power-supplies--Many-viable-options--but-know-the-tradeoffs on Nov. 24, 2019 (Year: 2016).*
Wikipedia, Schmitt Trigger, May 2017, Wikimedia Foundation; revision May 18, 2017; retrieved from https://en.wikipedia.org/w/index.php?title=Schmitt_trigger&oldid=781039257 on Nov. 24, 2019 (Year: 2017).*

* cited by examiner

*Primary Examiner* — Mohammad Ali
*Assistant Examiner* — Joshua T Sanders

(57) ABSTRACT

A power supply system, including: a plurality of power supply apparatuses; and an acquisition unit to acquire a load parameter representing load state of the plurality of power supply apparatuses as a whole, wherein each power supply apparatus has a control unit to control, depending on the load parameter, output by said power supply apparatus according to a reference condition different from at least the other one of the plurality of power supply apparatuses, will be provided.

23 Claims, 7 Drawing Sheets

| POWER SUPPLY APPARATUS NO. | 1 | 2 | 3 | | N |
|---|---|---|---|---|---|
| GROUP NO. | 1 | 2 | 1 | | 2 |
| EVEN-NUMBERED DAYS — NO-OUTPUT CONDITION | 25% | DO NOT STOP | 25% | ... | DO NOT STOP |
| EVEN-NUMBERED DAYS — OUTPUT CONDITION | 50% | — | 50% | | — |
| ODD-NUMBERED DAYS — NO-OUTPUT CONDITION | DO NOT STOP | 25% | DO NOT STOP | | 25% |
| ODD-NUMBERED DAYS — OUTPUT CONDITION | — | 50% | — | | 50% |

POWER SUPPLY SYSTEM AND POWER SUPPLY APPARATUS

The contents of the following Japanese patent application are incorporated herein by reference:

NO. 2017-113583 filed in JP on Jun. 8, 2017.

BACKGROUND

1. Technical Field

The present invention relates to a power supply system and a power supply apparatus.

2. Related Art

In power supply systems supplying power from a plurality of power supply apparatuses, an operation method where a central control device sets each of the plurality of power supply apparatuses in either output state or in no-output state depending on magnitude of load, has been proposed (see Patent Document 1, for example).

Patent Document 1: WO2015/015570

However, a power supply system in the patent document 1, if there occurs a problem in the central control device, may set the excessive number of power supply apparatuses in no-output state to cause power shortage. Also, due to a time lag in signal transmission at in a path between the central control device and each power supply apparatus, it may set the number of power supply apparatuses which do not fit the current situation in the no-output state to cause power shortage. Also, the number of the power supply apparatuses that can supply power varies due to its addition or maintenance etc., and, if this number is not tracked in real time by the central control device, power shortage may be caused.

SUMMARY

Therefore, it is an object of an aspect of the innovations herein to provide a power supply system and a power supply apparatus, which are capable of overcoming the above drawbacks accompanying the related art. The above and other objects can be achieved by combinations described in the claims. A first aspect of the present inventions may include a power supply system. The power supply system includes a plurality of power supply apparatuses. The power supply system includes an acquisition unit to acquire a load parameter representing load state of the plurality of power supply apparatuses as a whole. Each power supply apparatus has a control unit to control, depending on the load parameter, output by said power supply apparatus according to a reference condition different from at least the other one of the plurality of power supply apparatuses.

The control unit of each power supply apparatus independently determines whether the load parameter satisfies the reference condition.

The control unit of each power supply apparatus sets said power supply apparatus into the output state or the no-output state, depending on the load parameter.

The reference condition has an output condition to turn the power supply apparatus into the output state if the load parameter is greater than or equal to an output threshold value. The reference condition may have a no-output condition to turn the power supply apparatus into the no-output state if the load parameter is below a no-output threshold value. The output threshold value and the no-output threshold value may be different from each other.

The output threshold value is greater than the no-output threshold value.

The control unit of each power supply apparatus, if turning said power supply apparatus into no-output state, reduces output current of said power supply apparatus, and turns said power supply apparatus into no-output state, after confirming that voltage supplied to a target object for power output does not become less than or equal to a reference value or remains within a range predetermined based on a reference value.

During a process to turn said power supply apparatus into no-output state, the control unit of each power supply apparatus turns said power supply apparatus back into output state, before voltage supplied to a target object for power output becomes less than or equal to a reference value or goes out of a range predetermined based on a reference value.

During a process to turn said power supply apparatus into no-output state, the control unit of each power supply apparatus may turn said power supply apparatus back to output state, before output current of other power supply apparatus in output state becomes greater than or equal to a reference current value or goes out of a range predetermined based on a reference current value.

The plurality of power supply apparatuses may belong to any of a plurality of groups. The control unit of each power supply apparatus has a storage unit to store reference conditions that are different for groups to which said power supply apparatuses belong.

The storage units store each of the plurality of reference conditions corresponding to the plurality of groups. The control unit has a setting unit to set any of the plurality of reference conditions for use.

The power supply system includes a rack to contain the plurality of power supply apparatuses within a plurality of slots. The plurality of slots are each corresponding to any of the plurality of groups. The control unit of each power supply apparatus has a detection unit to detect a group corresponding to a slot which contains said power supply apparatus. The setting unit sets a reference condition for use corresponding to the group detected by the detection unit among the plurality of reference conditions.

The setting unit sets a reference condition selected by a user among the plurality of reference conditions for use.

The setting unit switches reference conditions for use among the plurality of reference conditions in reference period. Each power supply apparatus has an acquisition unit.

The plurality of power supply apparatuses, as a whole, have output characteristics where its output voltage value corresponds one-to-one with the load parameter value. The acquisition unit has a voltage acquisition unit to acquire output voltage of the plurality of power supply apparatuses as a whole. It has a calculation unit to calculate the load parameter using the output voltage of the plurality of power supply apparatuses as a whole.

The plurality of power supply apparatuses have output characteristics, which are equal among the plurality of power supply apparatuses, where an output voltage value corresponds one-to-one with a value of current output rate. The output characteristics may have characteristics such that output voltage gradually decreases as output current increases.

The power supply system includes a pair of signal lines which are each connected in common to the plurality of power supply apparatuses. The acquisition unit of each power supply apparatus has a current source to output current depending on output current of said power supply apparatus to one of the pair of signal lines. The acquisition unit of each power supply apparatus has a resistance, connected between the pair of signal lines, having a resistance value in inverse proportion to rated current of said power supply apparatus. The acquisition unit of each power supply apparatus has a switch, connected in series to the resistance, which is turned off if said power supply apparatus is turned into the no-output state, and is turned on if said power supply apparatus is in the output state. The acquisition unit of each power supply apparatus has a voltage measurement unit to measure voltage between the pair of signal lines. The acquisition unit of each power supply apparatus has a calculation unit to calculate the load parameter using the voltage between the pair of signal lines.

The power supply system includes a pair of signal lines which are each connected in common to the plurality of power supply apparatuses. The acquisition unit of each power supply apparatus has a voltage source to apply voltage depending on the output voltage of said power supply apparatus, between the pair of signal lines. The acquisition units of power supply apparatuses each have resistances, connected in series to the voltage sources, having same resistance values. The acquisition unit of each power supply apparatus has a switch, connected in series to the voltage source and the resistance, which is turned off if said power supply apparatus is turned into the no-output state, and is turned on if said power supply apparatus is in the output state. The acquisition unit of each power supply apparatus has a voltage measurement unit to measure voltage between the pair of signal lines. The acquisition unit of each power supply apparatus has a calculation unit to calculate the load parameter using the voltage between the pair of signal lines.

One of the pair of signal lines is a power output line. The acquisition unit acquires a predicted value of the load parameter from a target object for power output. The control unit modifies the reference condition if the predicted value exceeds a reference predicted value of the load parameter.

The plurality of power supply apparatuses each are detachably attached to said power supply system in a hot-plugging manner. Two or more power supply apparatuses in the output state have load factors which are equal to each other.

A second aspect of the present inventions may include a power supply apparatus. The power supply apparatus is used for the power supply system in the first aspect.

The summary clause does not necessarily describe all necessary features of the embodiments of the present invention. The present invention may also be a sub-combination of the features described above.

BRIEF DESCRIPTION OF THE DRAWINGS

FIG. 9 shows one example of a manner how to switch reference conditions according to a reference period.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

1. First Embodiment

Figure 1:
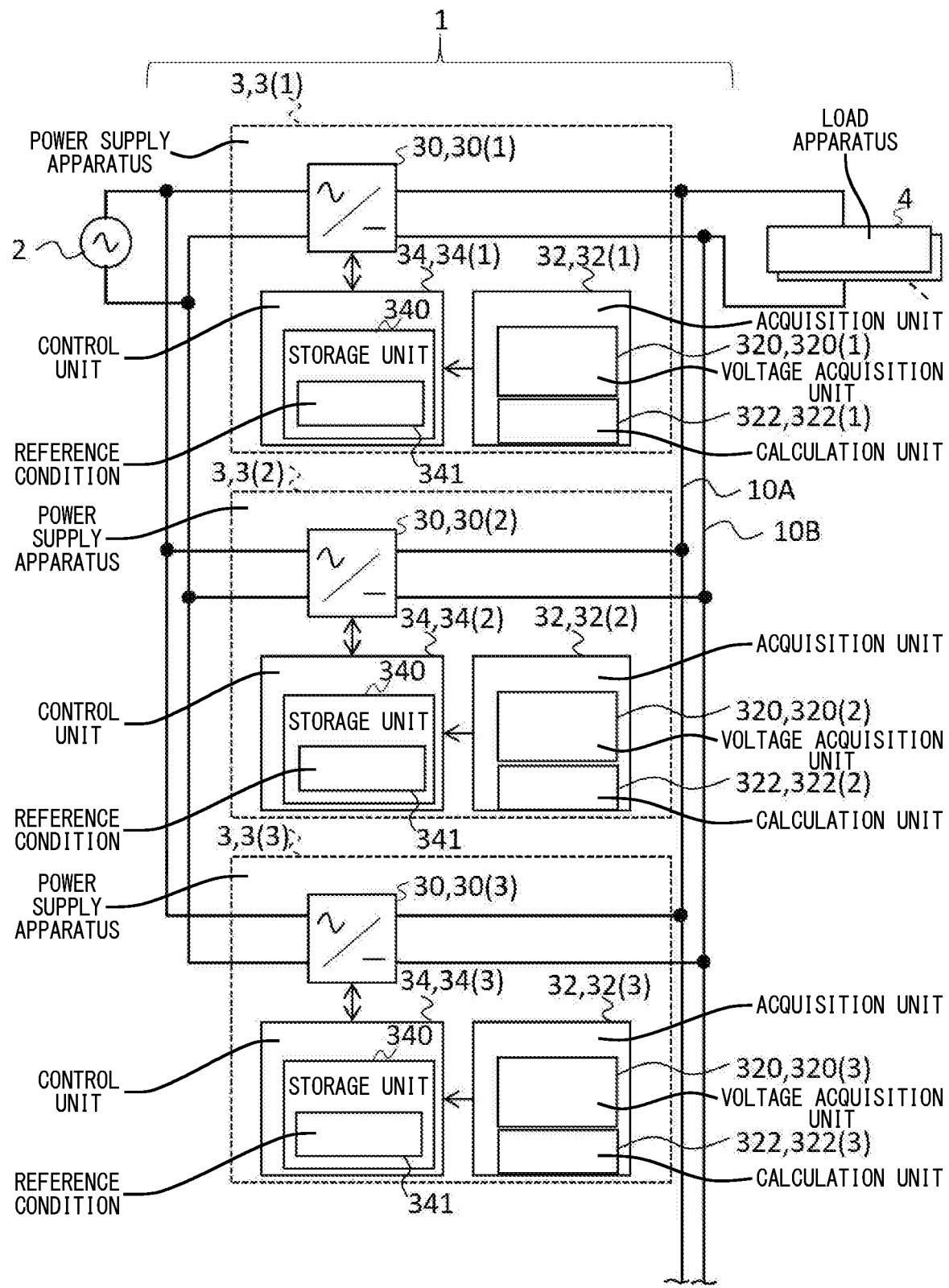
FIG. 1 shows a power supply system according to the present embodiment, together with an AC power supply and a load apparatus.

FIG. 1 shows a power supply system 1 according to the present embodiment, together with an AC power supply 2 and a load apparatus 4.

The AC power supply 2 supplies AC power to the power supply system 1. For example, the AC power supply 2 is a commercial power supply that supplies voltage of about 100V, 200V etc.

The load apparatus 4 consumes DC power supplied by the power supply system 1. In the present embodiment, as one example, the load apparatus 4 is a server, a super computer, or the like. Note that, a plurality of the load apparatuses 4 are connected to the power supply system 1. In this case, a plurality of the load apparatuses 4 may be a same kind or different kinds of apparatuses from each other.

The power supply system 1 converts the AC power by the AC power supply 2 into the DC power by each of the plurality of power supply apparatuses 3, and supplies them to the load apparatus 4. The power supply system 1, if its load power is small for its power capacity, turns off output of some of the power supply apparatuses 3, so that the rest of the power supply apparatuses 3 can operate at highly efficient operating points. The power supply system 1 includes a plurality of power supply apparatuses 3 belonging to any of a plurality of groups, and a pair of power output lines 10A, 10B to supply power to the load apparatus 4. In the present embodiment, as one example, the power supply system 1 includes three power supply apparatuses 3(1), 3(2), 3(3) belonging to three separate groups. Note that the number of the power supply apparatuses 3 is not limited to this number, but may be 100 to 1000, for example. Also, the number of the groups may be smaller than that of the power supply apparatuses 3, and the number of the power supply apparatuses 3 belonging to each group may be the same or different from each other.

A plurality of power supply apparatuses 3 shares the power output lines 10A, 10B. In the present embodiment, as one example, the power output line 10B, one of the power output lines 10A, 10B, is a grounding line.

The plurality of power supply apparatuses 3, if set to output state, converts power by the AC power supply 2 and outputs it, whereas, if set to no-output state, they do not output it. Each power supply apparatus 3 may be detachably attached to the power supply system 1 in a hot-plugging manner. For example, the power supply apparatus 3 is a rack-mounted type power supply module, and is contained in slots of one or more racks (not shown) to be connected to the power supply system 1. Each power supply apparatus 3 has a power conversion unit 30, an acquisition unit 32 and a control unit 34. In the present embodiment, as one example, the power supply apparatuses 3(1) to 3(3) have power conversion units 30(1) to 30(3), acquisition units 32(1) to 32(3) and control units 34(1) to 34(3), respectively.

The power conversion unit 30 converts AC power by the AC power supply 2 into DC power of voltage requested by the load, and outputs it. The power conversion unit 30 may further insulate between the AC power supply 2 and the load apparatus 4. In the present embodiment, as one example, the power conversion unit 30 supplies DC power having voltage of 12V or 48V etc. to the load apparatus 4. Note that in the present embodiment, as one example, power conversion efficiency of the power conversion unit 30 has its peak when the load factor of the power conversion unit 30 is about 50%. The load factor of the power conversion unit 30 means a rate of the current output to peak output or rated output of the power supply apparatus 3. In the present embodiment, as one example, the peak output and the rated output of the power conversion unit 30 are respectively different from those of the other power conversion units 30, but they may be the same. The power conversion unit 30, if the power supply apparatus 3 is in the no-output state, performs no operation for power conversion.

The acquisition unit 32 acquires a load parameter representing load state of the power supply system 1. Here, the load state of the power supply system 1 means power output state of the power supply system 1 depending on power consumption state of the load apparatus 4. In the present embodiment, as one example, the load parameter is load factor of the power supply system 1. The load factor of the power supply system 1 is a rate of the current output to the peak output or the rated output power supply apparatus 3 in the output state as a whole. The acquisition units 32(1) to 32(3) have voltage acquisition units 320(1) to 320(3) and calculation units 322(1) to 322(3), respectively.

The voltage acquisition unit 320 acquires output voltage as a whole of the power supply apparatus 3 in the power supply system 1. The voltage acquisition unit 320 acquires voltage between the pair of power output lines 10A, 10B to supply power to the load apparatus 4. The voltage acquisition units 320(1) to 320(3) of the power supply apparatuses 3(1) to 3(3) each measure voltage by respective voltage sensors of the power supply apparatuses 3(1) to 3(3). The voltage acquisition units 320(1) to 320(3) supply the acquired output voltages to the calculation units 322(1) to 322(3), respectively. The voltage acquisition unit 32 may be included in the control unit 34. If the power supply apparatuses 3 are each able to precisely operate in parallel, output voltage may be measured by a common voltage sensor.

The calculation unit 322 calculates the load factor using output voltage supplied by the voltage acquisition unit 320. For example, the power supply apparatus 3 of the power supply system 1 as a whole has the output characteristics where its output voltage value corresponds one-to-one with the load factor value, and the calculation unit 322 calculates the load factor corresponding to the current output voltage value using said output characteristics. The load factor, in the power supply system 1, can be obtained corresponding to an instantaneous value of analog quantity of the output voltage, and can be obtained without any complexed process such as AD conversion of the instantaneous value of the analog quantity. The calculation unit 322 supplies the calculated load factor to the control unit 34.

The control unit 34 controls output by the power supply apparatus 3 having said control unit 34, depending on the load factor supplied by the calculation unit 322. If the power supply apparatus 3 is in the output state, the control unit 34 is able to follow the change in the load factor in the order of milliseconds or less. The control unit 34 controls output according to a reference condition 341, after setting said power supply apparatus 3 in the output state when starting the power supply apparatus 3. The reference condition 341 is different from that of at least one of the other power supply apparatuses 3 in the power supply system 1 and is stored in a storage unit 340 included in the control unit 34.

The reference conditions 341 are different for respective groups of the power supply apparatus 3 and, as one example in the present embodiment, are different among the power supply apparatuses 3(1), 3(2), 3(3). That the reference conditions 341 are different means that conditions for output control of the power supply apparatuses 3 are different.

The reference condition 341 is a condition to set the power supply apparatus 3 in the output state or the no-output state, or a condition to control output power. In the present embodiment, as one example, the reference condition 341 has at least one of output condition to set the power supply apparatus 3 in the output state if the load factor is greater than or equal to an output threshold value, and a no-output condition to set the power supply apparatus 3 in the no-output state if the load factor is below the no-output threshold value. If the reference condition 341 has both the output condition and the no-output condition, the output threshold value and the no-output threshold value are not limited to the same value. If the output threshold value and the no-output threshold value are different, in the present embodiment, as one example, the output threshold value is greater than the no-output threshold value, but it is not limited to this. This can prevent the output state and the no-output state from being frequently switched because of operation with a hysteresis to set the power supply apparatus 3 into the output state or the no-output state (enable/disable operation).

The reference condition 341 is set such that power conversion efficiency (hereinafter, simply referred to as "efficiency") of the power supply apparatus 3 in the output state becomes equal to its peak efficiency or not less than its target efficiency. For example, in the present embodiment, the reference condition 341 has been set such that the load factor of the power supply apparatus 3 in the output state is maintained at about 50%, in order to maximize the efficiency. As one example, if the efficiency is low due to the load factor of 25% resulted from the large number of power supply apparatuses 3 in the output state, the reference condition 341 has been set such that a half of the number of power supply apparatuses 3 in the output state should be turned into the no-output state. Also, if the efficiency is low due to the load factor of 75% resulted from the small number of power supply apparatuses 3 in the output state, the reference condition 341 has been set such that some of the number of power supply apparatuses 3 in the no-output state should be turned into the output state.

The control unit 34 turns the power supply apparatus 3 into the output state or the no-output state depending on the load factor. For example, the control unit 34 turns the power supply apparatus 3 into the output state if the load factor satisfies the output condition, and it turns the power supply apparatus 3 into the no-output state if the load factor satisfies the no-output condition.

The control unit 34 controls the power supply apparatus 3 such that the load factors of two or more power supply apparatuses 3 in the output state should be equal to each other. As one example, each control unit 34 controls the output power such that, if the other power supply apparatuses 3 are switched into the no-output state and/or the output state, the output power by the power supply system 1 should be maintained, but it is not limited to this.

The control unit 34, when turning the power supply apparatus 3 into the no-output state, reduces output current of said power supply apparatus 3, and turns said power supply apparatus 3 into the no-output state after confirming that voltage supplied to the load apparatus 4 does not become less than or equal to a reference value or remains within a range of voltage predetermined based on a reference value. The output current is preferably reduced gradually. Also, the control unit 34 preferably sets the power supply apparatus 3 into the no-output state after a lapse of reference time (time required for calculating the load factor of the power supply system 1, as one example), after confirming that the supply voltage does not become less than or equal to a reference value, etc. If the power supply apparatus 3 which should be in the output state is set to the no-output state as a result of the load factor erroneously detected lower, and the like, due to some reasons such as noise mixing, contact failure of connectors, disconnection, other parts failure etc., the other power supply apparatuses 3 in the output state output current exceeding the rated current in order to maintain the output power of the power supply system 1 to compensate for the current reduction. In this case, the output voltage is lowered to protect against overcurrent. The control unit 34 sets the power supply apparatus 3 into the no-output state after confirming that such voltage reduction does not occur, that is, after confirming that the power supply apparatus 3 is not switched erroneously into the no-output state. The control unit 34 lowers output current of the power supply apparatuses 3 and may set the power supply apparatus 3 into the no-output state after confirming that the output current of the other power supply apparatuses 3 in the output state does not exceed the rated current. Here, the control unit 34 uses, as the voltage supplied to the load apparatus 4, voltage acquired by the voltage acquisition unit 320 or output voltage calculated based on the output current. The control unit 34 may perform the confirmation at the timing when the output current reaches zero.

If the voltage supplied to the load apparatus 4 is less than or equal to a reference value during a process to turn the power supply apparatus 3 into the no-output state, the control unit 34 partially or entirely stops turning into the no-output state and sets said power supply apparatus 3 back into the output state, before the supplied voltage becomes less than or equal to the reference value or remains within a range of voltage predetermined based on the reference value (exceeds a lower limit, as one example). Alternatively, if the voltage supplied to the load apparatus 4 is less than or equal to a reference value during a process to turn the power supply apparatus 3 into the no-output state, the control unit 34 turns said power supply apparatus 3 back into the output state, before the output current of the other power supply apparatuses 3 in the output state becomes greater than or equal to the reference current value or goes out of a range predetermined based on the reference current value. If having turned said power supply apparatus 3 back into the output state, the control unit 34 monitors the load factor of the power supply system 1 for the reference time period, and if the state where the load factor is below the no-output threshold value (i.e. in light load state, for example) continues, the control unit 34 turns again said power supply apparatus 3 into the no-output state.

The control unit 34 independently determines whether the load factor satisfies the reference condition 341. For example, the control unit 34(1) makes the determination independent of the determination results by the control units 34(2), 34(3) of the other power supply apparatuses 3(2), 3(3). Also, the control unit 34(1) determines it regardless of determination timings of the other control units 34(2), 34(3).

According to the power supply system 1 described above, the control unit 35 of each power supply apparatus 3 autonomously controls the output by the power supply apparatus 3 depending on the load factor, according to a reference condition 341 which is different from that of at least one of the other power supply apparatuses 3 of the power supply apparatuses 3 in the power supply system 1. Thus, unlike the case where output of the plurality of power supply apparatuses 3 is centrally controlled, it is prevented that power shortage occurs due to the excessive number of power supply apparatuses turned into the no-output state, which is caused by troubles occurred in a central control device. Also, the shorter a path of a control signal is, the control unit 35 can more easily follow load variation in the order of milliseconds or below, which prevents the power shortage from occurring because a number of power supply apparatuses, the number of which does not fit the current situation due to time lag in signal transmission, are turned into the no-output state.

Also, the calculation units 322 of each power supply apparatuses 3 calculates the load factor depending on power supplied by the power supply system 1 to the load apparatus 4. Thus, the load factor can be calculated without requiring any of the following information: the number of the power supply apparatuses 3 included in the power supply system 1, the number of power supply apparatuses 3 in the output state, and the peak output and the rated output of the power supply apparatus 3. Therefore, the load factor can be calculated precisely, even if the number of power supply apparatus 3 is varied up and down in case of its addition or maintenance etc. Also, sequential notifications to the control unit 34 of the information of the number of the power supply apparatuses 3, particularly the number of ones in operation, can be eliminated.

Also, the control unit 34, when turning the power supply apparatus 3 into the no-output state, reduces output current of the power supply apparatus 3, and turns said power supply apparatus 3 into the no-output state after confirming that voltage supplied to the load apparatus 4 does not become less than or equal to a reference value or remains within a range of voltage predetermined based on a reference value. Thus, this can prevent some of the power supply apparatuses 3 from turning in the no-output state, if the load factor is erroneously detected lower.

Figure 2:
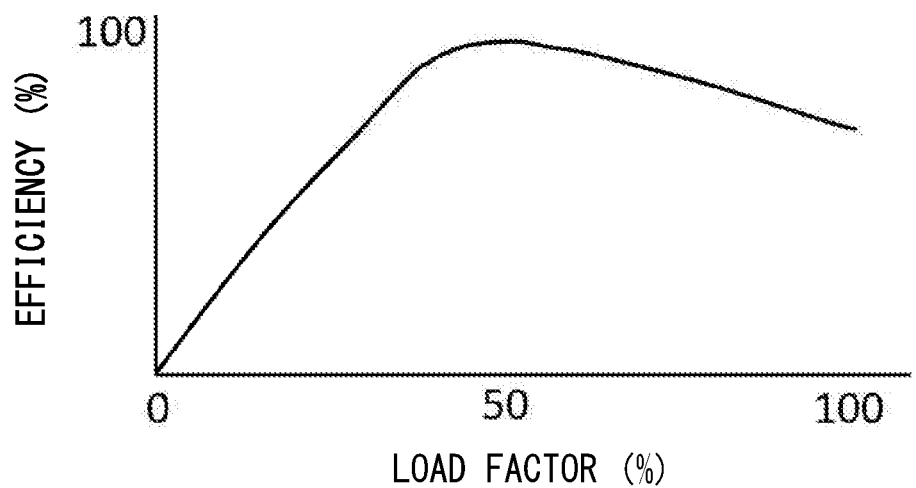
FIG. 2 shows an example of energy efficiency of each power supply apparatus.

Next, efficiency of each power supply apparatus 3 will be described. FIG. 2 shows an example of the efficiency of each power supply apparatus 3. In the figure, the vertical axis represents efficiency (%) of the power supply apparatus 3, and the horizontal axis represents rate of output current to rated output current i.e. load factor (%).

In a region where the load factor is closer to zero, the efficiency can be low due to the existence of fixed loss which does not depend on current amount. Also, when the load factor exceeds 50%, as a result of a rate of resistance loss, which is proportional to the square of the current amount, becomes greater, the efficiency can be lowered. Thus, shown here in the present example, the efficiency reaches its peak around 50% of the load factor.

Figure 3:
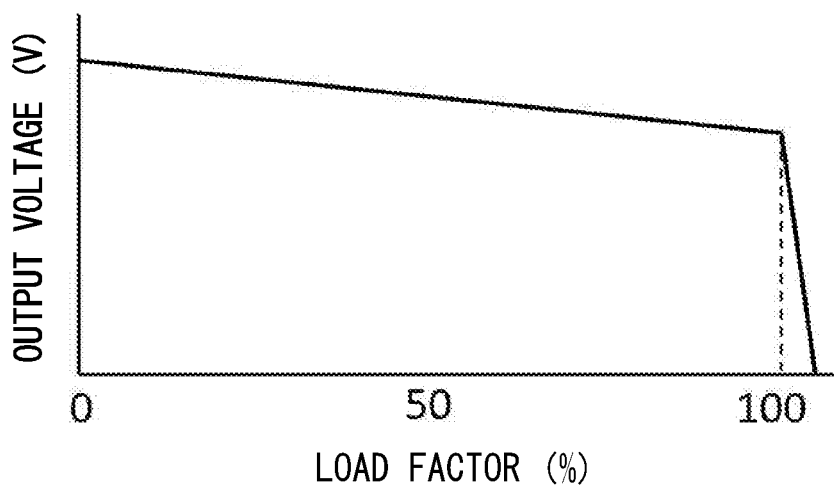
FIG. 3 shows output characteristics of each power supply apparatus.

Next, output characteristics of each power supply apparatus 3 will be described. FIG. 3 shows the output characteristics of each power supply apparatus 3. In the figure, the vertical axis is output voltage (V) of the power supply apparatus 3, and the horizontal axis is its load factor (%).

Each of the plurality of power supply apparatuses 3 of the power supply system 1 has the output characteristics where its output voltage value corresponds one-to-one with the load factor value. For example, the output characteristics are characteristics where the output voltage gradually decreases, as the output current increases (i.e. droop characteristics). Also, it is assumed that the output characteristics are equal among the plurality of power supply apparatuses 3. This enables each power supply apparatus 3 in the output state and the no-output state to easily calculate the load factor of the power supply system 1 as a whole, using the output voltage acquired by each power supply apparatus 3.

Figure 4:
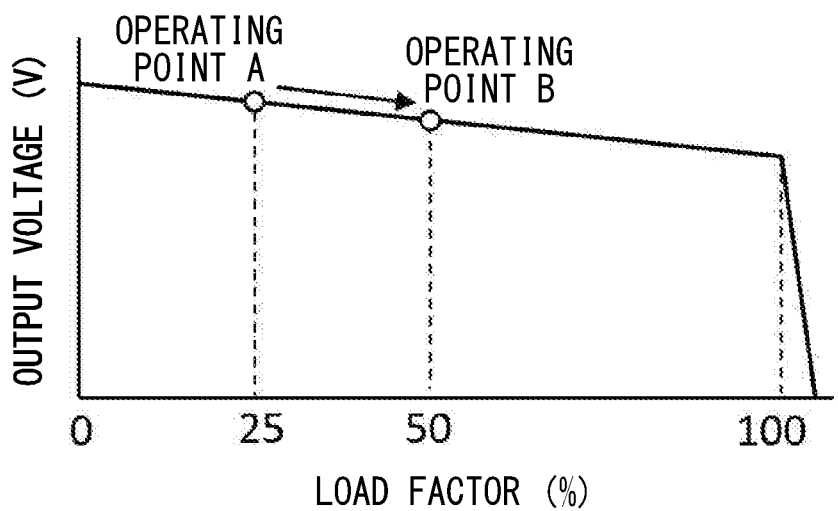
FIG. 4 shows how to calculate a load factor of the power supply system as a whole.

Next, calculating the load factor of the power supply system 1 as a whole will be described using FIG. 4. In FIG. 4, like in FIG. 3, the vertical axis is output voltage (V) of the power supply apparatus 3, and the horizontal axis is its load factor (%).

The power supply system 1 as a whole, like in each power supply apparatus 3, has output characteristics where its output voltage value corresponds one-to-one with the load factor value. Here, when the output voltage acquired by the power supply apparatus 3 in the output state is at an operating point A in the figure, if power supply apparatuses 3 each have the same output characteristics among them, the load factor of power supply system 1 as a whole can be calculated as 25%. In order to make the efficiency of the power supply apparatus 3 in the output state around 50%, a predetermined half of the number of the plurality of power supply apparatuses 3 in the output state are turned into the no-output state, and the rest half are maintained in the output state. If the load factor increases further more in this state, in order to make the efficiency of the power supply apparatus 3 in the output state around 50%, the power supply apparatus 3 in the no-output state is made turned into the output state. Note that as one example, a setting unit (not shown) shared with the plurality of power supply apparatuses 3 sets which one(s) of the plurality of power supply apparatuses 3 in the output state should be turned into the no-output state. In this case, the setting may be modified regularly, depending on operation history or deterioration state etc. of the power supply apparatus 3.

1-1. First Modification of the First Embodiment

Figure 5:
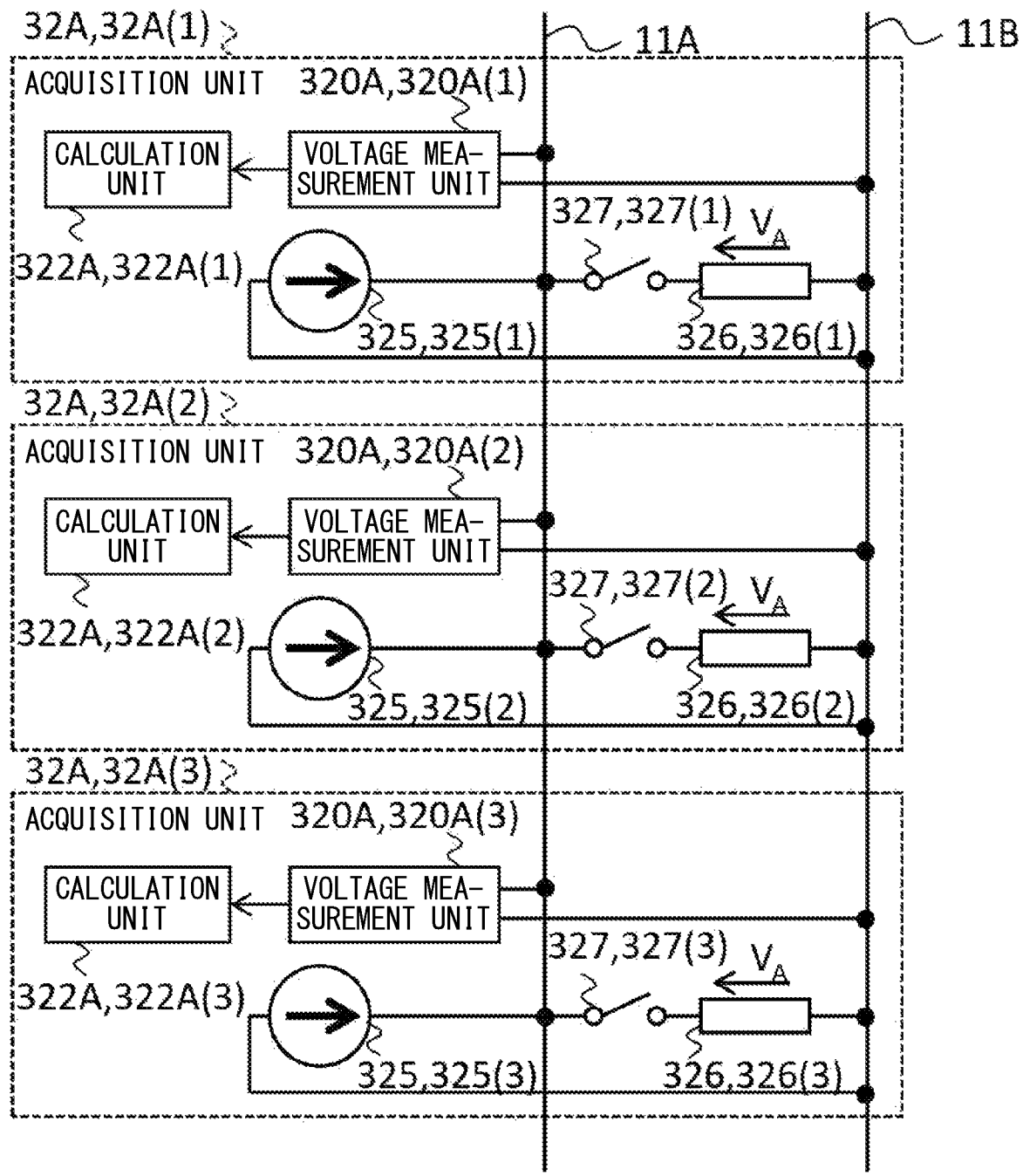
FIG. 5 shows an acquisition unit according to a first modification.

Now, a first modification of the first embodiment will be described. FIG. 5 shows an acquisition unit 32A according to the first modification. Note that in modifications and the other following embodiments, the substantially same configurations as those of FIG. 1 are given the same reference numerals, and description thereof will be omitted.

In the present modification, the power supply system 1 includes a pair of signal lines 11A, 11B. The signal lines 11A, 11B are shared with three power supply apparatuses 3(1) to 3(3) and connected to each of them.

Also, the power supply apparatuses 3(1) to 3(3) each have acquisition units 32A(1) to 32A(3), additionally or alternatively to the acquisition unit 32 in the first embodiment described above. The acquisition unit 32A acquires the load factor of the power supply system 1 differently from the acquisition unit 32 described above. The acquisition units 32A(1) to 32A(3) have current sources 325(1) to 325(3), resistances 326(1) to 326(3), switches 327(1) to 327(3), voltage measurement units 320A(1) to 320A(3) and calculation units 322A(1) to 322A(3), respectively.

The current source 325 outputs current depending on output current of the power supply system 1 to the signal line 11A, which is one of the pair of signal lines. For example, the current sources 325(1) to 325(3) output, to the signal line 11A, signal current that is proportional to respective main circuit current which power supply apparatuses 3(1) to 3(3) each output to the power output lines 10A, 10B. As one example, the current source 325(1) outputs, to the signal line 11A, current which corresponds to current output to the power output lines 10A, 10B by the power conversion unit 30(1) in the FIG. 1 (for example, 1/100 of the total value of the currents thereof). Output current value from the power output lines 10A, 10B are measured values of the output current by a current sensor, for example. If the control unit 34 calculates an instruction value on output current to the power output lines 10A, 10B if the power supply apparatus 3 is in operating state, this instruction value may be used as an output current value to the power output lines 10A, 10B.

The resistance 326 is connected between the signal lines 11A and 11B. The resistances 326(1) to 326(3) have resistance values which are inversely proportional to the rated current of the power supply apparatuses 3(1) to 3(3), respectively. In the present embodiment, as one example, resistance values $R_1$ to $R_3$ of the resistances 326(1) to 326(3) of the power supply apparatuses 3(1) to 3(3) are regarded as the same value (R, for example).

The switch 327 is connected in series to the resistance 326. The switches 327(1) to 327(3) each are turned off if the power supply apparatuses 3(1) to 3(3) are made into the no-output state, and they are turned on if the power supply apparatuses 3(1) to 3(3) are in the output state. The switches 327(1) to 327(3) are controlled open/close by the control units 34(1) to 34(3), but may be controlled open/close by other means that are not shown in the figures.

The voltage measurement unit 320A measures voltage $V_A$ between the signal lines 11A, 11B. For example, the voltage measurement unit 320A may measure the voltage $V_A$ by a voltage sensor. The voltage measurement units 320A(1) to 320A(3) supply the measured voltages $V_A$ to the calculation units 322A(1) to 322A(3).

The calculation unit 322A calculates the load factor using the voltage $V_A$ between the signal lines 11A, 11B. For example, the calculation unit 322A calculates the voltage $V_A$ between the signal lines 11A, 11B as the load factor of the power supply system 1.

Here, in the present modification, a combined resistance value $R_t$ is R/3 if the power supply apparatuses 3(1) to 3(3) are in the output state. When assuming that the power supply apparatuses 3 are all in the output state, the voltage $V_A$ acquired by each of voltage measurement units 320A(1) to 320A(3) is IR(=3I×R/3). Further, if the number of the power supply apparatuses 3 in the output state is one, the combined resistance value $R_t$ will be R, and the voltage $V_A$ acquired by each of the voltage measurement units 320A(1) to 320A(3) is 3IR(=3I×R). In such manner, when the number of the power supply apparatuses 3 in the output state becomes one from three, it is calculated that the value of the $V_A$ becomes three times the original value, which means, when considered as the load factor of the power supply apparatus 3 in the output state, the load factor becomes three times the original value. Also, the calculation can be performed similarly for the case where the number of the power supply apparatuses 3 in the output state is increased. Such information of the load factor can be instantaneously transmitted as analog quantity, which enables to immediately turn the power supply apparatus in the no-output state into the output state even if the load factor increases in the order of milliseconds.

According to the present modification, the load factor of the power supply system 1 is calculated as above. Thus, the acquisition unit 32A of each power supply apparatus 3 can calculate the load factor of the power supply system 1 without requiring any of the following information: the number of the power supply apparatuses 3 included in the power supply system 1, the number of the power supply apparatuses 3 in the output state, and the peak output and the rated output of the power supply apparatus 3.

Note that one line of the signal lines 11A, 11B may be shared with one line of the power output lines 10A, 10B. In the present embodiment, as one example, a line of the signal line 11B may be shared with the power output line 10B as the grounding line.

1-2. Second Modification of the First Embodiment

Figure 6:
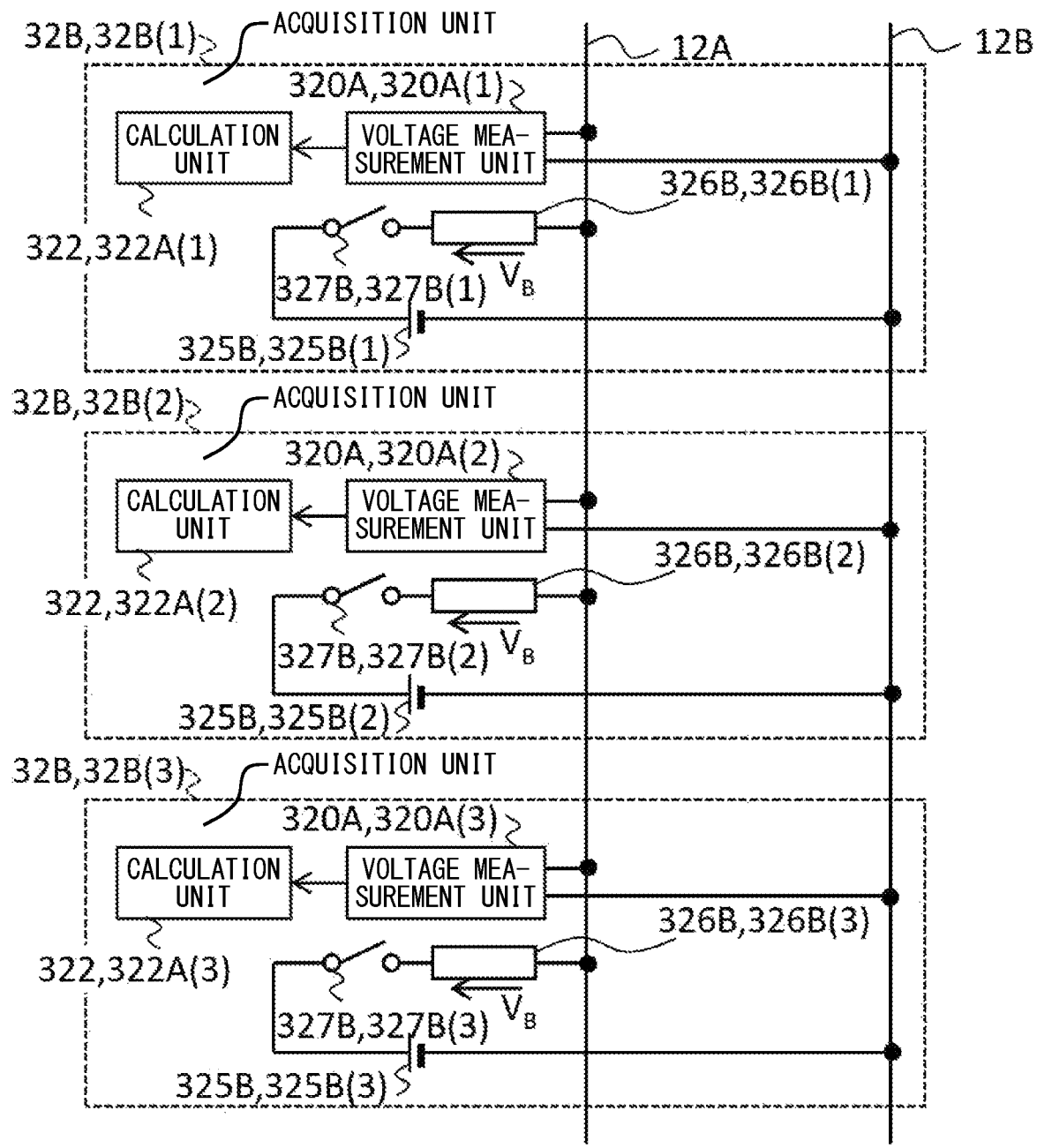
FIG. 6 shows an acquisition unit according to a second modification.

Now, a second modification of the first embodiment will be described. FIG. 6 shows an acquisition unit 32B according to the second modification.

In the present modification, the power supply system 1 includes a pair of signal lines 12A, 12B. The signal lines 12A, 12B are shared with three power supply apparatuses 3(1) to 3(3) and connected to each of them.

Also, power supply apparatuses 3(1) to 3(3) each may have acquisition units 32B(1) to 32B(3), additionally or alternatively to at least one of the acquisition units 32, 32A described above. The acquisition unit 32B acquires the load factor of the power supply system 1 differently from the acquisition unit 32, 32A described above. The acquisition units 32B(1) to 32B(3) have voltage sources 325B(1) to 325B(3), resistances 326B(1) to 326B(3), switches 327B(1) to 327B(3), the voltage measurement units 320A(1) to 320A(3), and the calculation units 322A(1) to 322A(3), respectively.

The voltage source 325B applies, between the signal lines 12A, 12B, voltage depending on the output current of the power supply apparatus 3. For example, the voltage sources 325B(1) to 325B(3) each output, between the signal lines 12A, 12B, voltage which is proportional to current output by the power conversion units 30(1) to 30(3) in FIG. 1 to the power output lines 10A, 10B.

The resistance 326B is connected in series to the voltage source. The resistances 326B(1) to 326B(3) of the plurality of power supply apparatuses 3(1) to 3(3) have resistance values $R_c$ which are equal to each other.

The switch 327B is connected in series to the voltage source 325B and the resistance 326B. The switches 327B(1) to 327B(3) each are turned off if the power supply apparatuses 3(1) to 3(3) are made into the no-output state, and they are turned on if said power supply apparatuses 3(1) to 3(3) are in the output state. The switches 327(1) to 327(3) each are controlled open/close by the control units 34(1) to 34(3), but may be controlled open/close by other means that are not shown in the figures.

Here, in the present modification, voltage $V_B$ is an averaged value of the voltage applied between the signal lines 12A, 12B by the power supply apparatus 3 in the output state. As one example, the voltage $V_B$ is "1" if the power supply apparatuses 3(1) to 3(3) each are in the output state, output respective rated current to the power output lines 10A, 10B, and output, to the signal lines 12A, 12B, voltage of a value proportional to this rated current, for example 1V. Also, the voltage $V_B$ is again "1" if only some of the power supply apparatuses 3(1) to 3(3), for example, the power supply apparatuses 3(1), 3(2), are in the output state and each output the respective rated current to the power output lines 10A, 10B, and output voltage of 1V to the signal lines 12A, 12B, because voltage of the voltage source 325B(3) is 0V within the power supply apparatus 3(3) while the switch 327B is off. That is, the voltage $V_B$ is at a value proportional to the load factor to the total current capacity in the output state (or, during operation). For example, the voltage $V_B$ is at 0.66($=\frac{2}{3}$)V, if the power supply apparatuses 3(1), 3(2), 3(3) are in the output state, the power supply apparatuses 3(1), 3(2) each output respective rated current and, according to this rated current, the voltage source 325B belonging to the power supply apparatuses outputs voltage at 1V, whereas the power supply apparatus 3(3) outputs almost no current and the voltage source 325B(3) belonging to it outputs voltage at almost 0V. Thereby, it can be read out that output current of the whole system (that equals to load current) is two-thirds of the total current capacities for three power supply apparatuses 3 in operation.

According to the present modification, the load factor of the power supply system 1 is calculated as above. Thus, the acquisition unit 32B of each power supply apparatus 3 can calculate the load factor of the power supply system 1 without requiring any of the following information: the number of the power supply apparatuses 3 included in the power supply system 1, the number of the power supply apparatuses 3 in the output state, and the peak output and the rated output of the power supply apparatus 3.

Note that one line of the signal lines 12A, 12B may be shared with one line of the power output lines 10A, 10B. In the present embodiment, as one example, a line of the signal line 12B may be shared with the power output line 10B as the grounding line.

Here, in the first and the second modification described above, if the acquisition unit 32, the acquisition unit 32A and/or the acquisition unit 32B each acquire load factors, load factor(s) obtained by the acquisition unit 32A and/or the acquisition unit 32B may be used with priority to load factor obtained by the acquisition unit 32. For example, if the load factor(s) obtained by the acquisition unit 32A and/or the acquisition unit 32B is(are) at abnormal value(s), instead of this load factor, the load factor obtained by the acquisition unit 32 is used, but it is not limited to this. Similarly, the priority of each load factor acquired by the acquisition unit 32A and the acquisition unit 32B is not limited.

1-3. Third Modification of the First Embodiment

Figure 7:
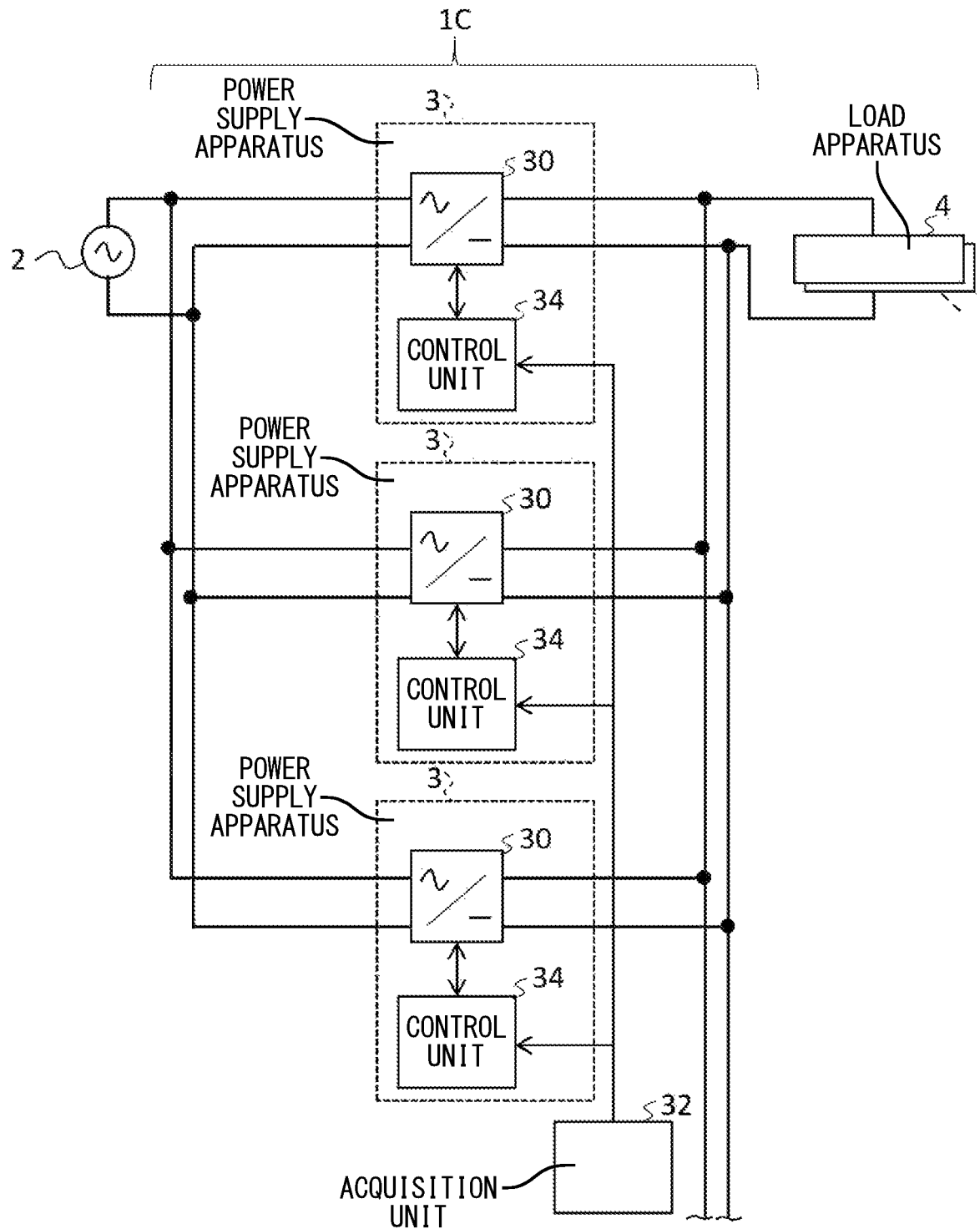
FIG. 7 shows a power supply system according to a third modification.

Now, a third modification of the first embodiment will be described. FIG. 7 shows a power supply system 1C according to the third modification.

The power supply system 1C has an acquisition unit 32 shared with the plurality of power supply apparatuses 3. The acquisition unit 32 of the present modification may supply an acquired load parameter to the control unit 34 of each power supply apparatus 3.

According to the power supply system 1C of the present modification, only one acquisition unit 32 is included, which enables to simplify the configuration.

1-4. Fourth Modification of the First Embodiment

Now, a fourth modification of the first embodiment will be described. In the present modification, the control unit 34 modifies contents of the reference condition 341.

For example, the control unit 34 modifies the reference condition 341 such that the power supply apparatus 3 turns into the output state or the no-output state at pre-set timing. As one example, the control units 34(1) to 34(3) modifies the reference condition 341 such that the power supply apparatus 3 turns into the no-output state according to a schedule regularly set by date and time or days. Thereby, the power supply apparatus 3 can regularly take rests. Also, the control units 34(1) to 34(3) can modify the reference condition 341 such that the power supply apparatuses 3(1) to 3(3) turn into the no-output state on each particular date and time. Thereby, the maintenance of the power supply apparatus 3 can be conducted.

Also, the control unit 34 may modify the reference condition 341 such that, if the load factor of the power supply system 1 does not become low, the power supply apparatus 3 is maintained in the output state. For example, the control unit 34 modifies the reference condition 341, if the load factor is not below 50% because of the small number of the power supply apparatuses 3 in the power supply system 1. Thereby, some of the power supply apparatuses 3 turning into the no-output state can prevent load of the power supply apparatus 3 in the output state from increasing.

Also, the control unit 34 may modify the reference condition 341 such that the power supply apparatus 3 turns into the output state or the no-output state, depending on temperature of the power supply apparatus 3 measured by a temperature sensor (not shown) or rotational speed of a cooling fan included in the power supply apparatus 3. As one example, the control units 34(1) to 34(3) each modify the reference condition 341 such that the higher the measured temperature is, or the higher the rotational speed of the cooling fan is, the greater the rate to turn into the no-output state is. Thereby, heat-generating power supply apparatuses 3 can be turned off.

Also, the control unit 34 may modify the reference condition 341 such as the power supply apparatus 3 turns into the output state or the no-output state, depending on estimated life time of the power supply apparatus 3.

As one example, the control units 34(1) to 34(3) each modify the reference condition 341 such as the shorter the estimated life time is, the greater the rate to turn into the no-output state is. Thereby, the power supply apparatus 3 having short estimated life time can be used for longer time.

Also, the control units 34(1) to 34(3) each may modify the reference condition 341 such as the shorter the estimated life time is, the smaller the rate to turn into the no-output state is. Thereby, life time of the power supply apparatus 3 can be made shorten intentionally for its earlier replacement. This can be used as a way to avoid all the power supply apparatuses turn into the state requiring replacement at the same time.

Also, if the plurality of power supply apparatuses 3 have been decided to be replaced together regardless the estimated life time, the control units 34(1) to 34(3) each modify the reference condition such that the longer the estimated life time is, the greater the rate to turn into the output state is. Thereby, the plurality of power supply apparatuses 3 can be used equally until its replacement timing.

Also, the control unit 34 may modify the reference condition 341 by adjusting other control unit 34 of the other power supply apparatuses 3 such that power supply apparatuses 3 having similar estimated life time reach their replacement timing at the same time or at different times.

Note that the control unit 34 calculates the estimated life time of the power supply apparatus 3 using time period during power supply apparatus 3 in the output state i.e. integrated time in its operation, but a method to calculate is not limited to this. The control unit 34 may calculate the estimated life time using the time period during the power supply apparatus 3 being in the output state, which is weighted by temperature or environmental temperature of the power supply apparatus 3 at that time. The control unit 34 may notify a user the estimated life time of the power supply apparatus 3 to notify the replacement timing of the power supply apparatus 3.

2. Second Embodiment

Figure 8:
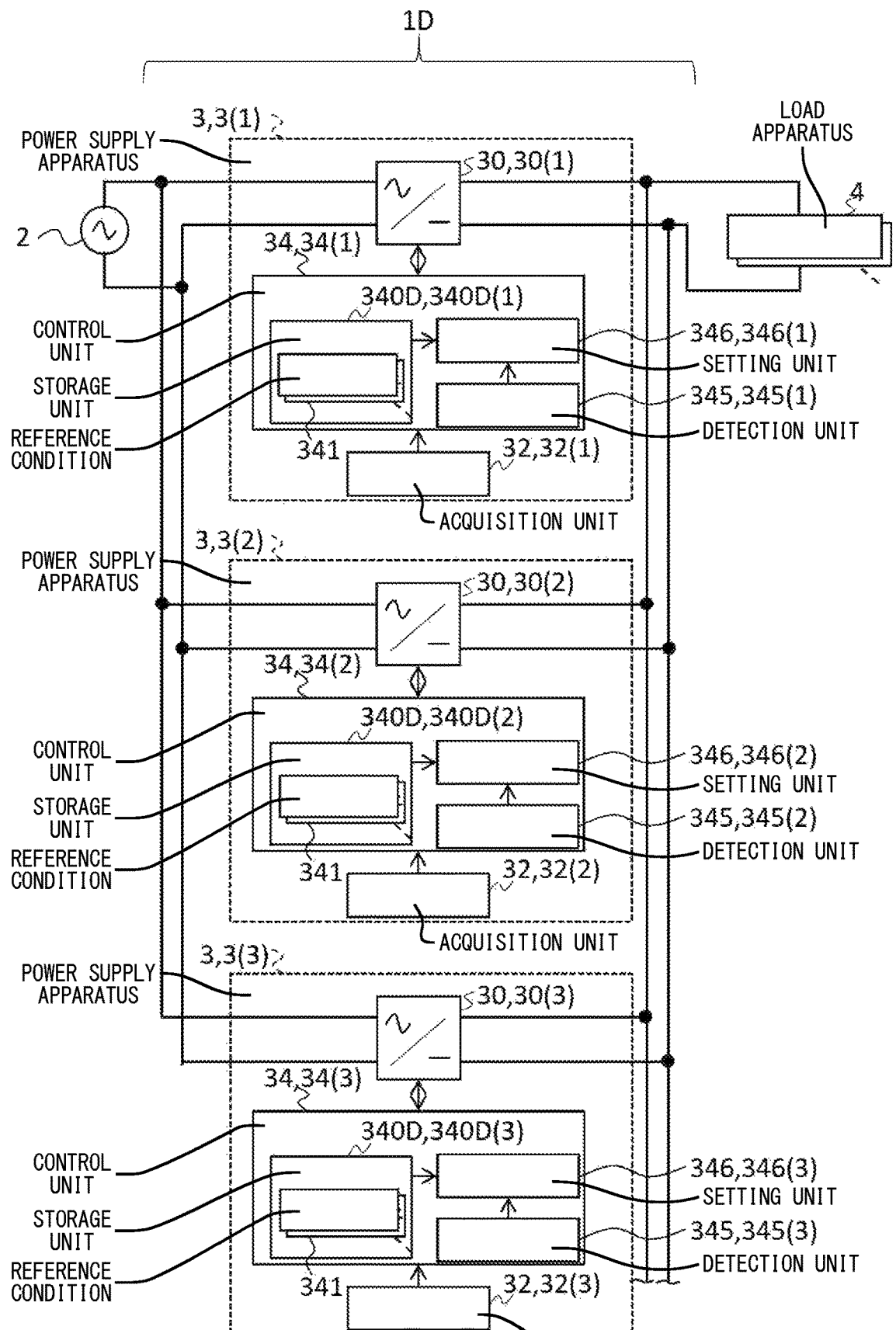
FIG. 8 shows a power supply system according to a second embodiment.

Now, a second embodiment will be described. FIG. 8 shows a power supply system 1D according to the second embodiment.

The power supply system 1D in the present embodiment includes one or more racks (not shown) containing a plurality of power supply apparatuses 3 within a plurality of slots. As one example, each rack has five slots.

Each slot corresponds to any of a plurality of groups of the power supply apparatus 3 and makes power supply apparatuses 3 contained within said slot detect which group the power supply apparatuses 3 belong to. For example, the slots have protrusions provided, the protrusion being different in positions and/or shapes for different groups. Also, the slots have terminals provided, the terminal being able to communicate group identification information (identification number, as one example in the present embodiment) to the power supply apparatus 3.

The groups corresponding to the slots may be set depending on distances from an output terminal to the power supply system 1D. In the present embodiment, as one example, a closer slot to the output terminal, that is, a closer slot to the load apparatus 4 may correspond to a group with a smaller identification number.

The control units 34(1) to 34(3) of power supply apparatuses 3(1) to 3(3) in the power supply system 1D have storage units 340D(1) to 340D(3), detection units 345(1) to 345(3), and setting units 346(1) to 346(3), respectively.

The storage units 340D each store the plurality of reference conditions 341 corresponding to the groups with the power supply apparatus 3. In the present embodiment, as one example, the storage units 340D(1) to 340D(3) each store three reference conditions 341 corresponding to the three groups of the power supply apparatus 3(1) to 3(3).

Here, in the present embodiment, the reference condition 341 corresponding to the group of smaller identification number is, the lower the output threshold value is. For example, in the reference condition 341 corresponding to the group of identification number "1", the output threshold value may be zero. Thereby, in the power supply system 1D, the power supply apparatus 3 close to the output terminal has greater rate to be in the output state, as compared with the power supply apparatus 3 far from the output terminal.

The detection unit 345 detects a group corresponding to the slot which contains the power supply apparatus 3. For example, if different protrusions are provided for different groups in the slots, the detection unit 345 may detect a group corresponding to the slots by detecting a position and/or a shape of said protrusion. Also, if a terminal to communicate the identification number of the groups is provided in the slot, the detection unit 345 may detect a group corresponding to the slots by the identification number sent form said terminal. The detection unit 345 supplies detection results to the setting unit 346.

The setting unit 346 sets any of the plurality of reference conditions 341 for use. For example, the setting unit 346 sets a reference condition 341 for use corresponding to a group detected by the detection unit 345, among the plurality of reference conditions 341.

According to the power supply system 1D described above, any of the reference conditions 341 stored in the storage units 340D regarding the respective plurality of groups is set for use. Thus, the reference condition 341 can be switched depending on usage situation of the power supply apparatus 3. Also, the step of producing the power supply apparatus 3 for each group can be eliminated.

Also, a group corresponding to the slot containing the power supply apparatus 3 is detected and a reference condition 341 corresponding to the group is set for use. Thus, the reference condition 341 can be easily switched by moving the power supply apparatus 3 into another slot within the rack.

Also, in the power supply system 1D, the power supply apparatus 3 close to the output terminal has greater rate to be in the output state, as compared with the power supply apparatus 3 far from the output terminal. Thus, as a power supply apparatus 3 having smaller power loss on the power transmission path is used with priority, the efficiency of the power supply system 1 can be improved.

2-1. Modification of the Second Embodiment

Note that in the second embodiment described above, it was described that the power supply apparatus 3 switches the reference conditions 341 by detecting, by the detection unit 345, the group corresponding to the slot containing the power supply apparatus 3, but, additionally or alternatively, it may switch the reference condition 341 in other manners.

For example, the setting unit 346 sets the reference condition 341 selected by the user for use among plurality of reference conditions 341 stored in the storage units 340D. The setting unit 346 has selecting means to receive operation of user selection of the reference condition 341. In this case, the reference condition 341 can be optionally switched depending on usage frequency, the estimated life time of the power supply apparatus 3, etc., for example.

Also, the setting unit 346 may switch, in reference period, reference conditions 341 for use among the plurality of reference conditions 341 stored in the storage unit 340D. The setting unit 346 has clock means to detect how much time has passed within the reference period, or acquisition means to acquire time information. Here, FIG. 9 shows one example of a manner to switch the reference conditions 341 according to the reference period. In the present modification, the N power supply apparatuses 3 in the power supply system 1 belong to two, or three or more groups and, in the groups "1", "2", the reference conditions 341 is are switched in one day cycle. As one example, at the group "1", on even-numbered days, the reference condition 341 is switched in the no-output state when the load factor is below 25% and switched in the output state when the load factor is 50% or above, whereas, on odd-numbered days, it is maintained in the output state regardless of value of the load factor. Also, at the group "2", on odd-numbered days, the reference condition 341 is switched in the no-output state when the load factor is below 25% and switched in the output state when the load factor is 50% or above whereas, on even-numbered days, it is maintained in the output state regardless of value of the load factor. Thereby, the plurality of power supply apparatuses 3 can be used equally.

3. Modification of the Embodiment

Note that in the first and the second embodiments and the modifications thereof described above, it was described that the acquisition unit 32 calculates the load factor as the load parameter of the power supply system 1, but it may calculate the other load parameter representing load state as a whole of the power supply apparatus 3. In this case, the control unit 34 may control the output by the power supply apparatus 3 depending on the load parameter. The other load parameter representing the load state may be an output current value, for example.

Also, it was described that the acquisition unit 32 calculates the load parameter by the calculation units 322, 322A, 322B, but a predicted value of the load parameter may be acquired from the load apparatus 4 as a target object for power output. For example, if the load apparatus 4 is a computer such as a server, the predicted load parameter may be supplied to the acquisition unit 32, depending on contents to process, such as consumption power during processing the contents. The predicted value may be supplied one second earlier the timing for actual power consumption, or much earlier or much later. The load apparatus 4 may acquire, from the power supply system 1, information such as the following: the number of power supply apparatuses 3 included in the power supply system 1, the number of the power supply apparatuses 3 in the output state, and the peak output and the rated output of the power supply apparatus 3, and may use them to predict the load parameter.

In case the acquisition unit 32 acquires the predicted value of the load parameter, if the predicted value of the load parameter exceeds the reference predicted value, the control unit 34 may modify the reference condition 341. For example, if the predicted value of the load factor exceeds 80%, the control unit 34 modifies the reference condition 341 such that an output reference value to switch from the no-output state into the output state is lower than that of the case where the predicted value of the load factor does not exceed 80%. Additionally or alternatively, the control unit 34 may modify the reference condition 341 such that the no-output reference value to switch the state from the output state into the no-output state is lower. Thereby, more power supply apparatuses 3 are in the output state, which enables power supply to follow the increased load factor. The control unit 34 may switch reference conditions 341 to use within the plurality of reference conditions 341.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiment(s) of the present invention can be used to prevent occurrence of power shortage.

What is claimed is:

1. A power supply system comprising:
   a plurality of power supply apparatuses connected in parallel to power a common load; and a voltmeter adapted to measure a load parameter representing a load state of the plurality of power supply apparatuses as a whole, wherein each of the plurality of power supply apparatuses comprises:
an AC to DC power converter adapted for connection between an input AC power source, and an output DC power to drive the common load;
a reference condition memory to store a preset reference condition for ON/OFF control of the output DC power of the AC to DC power converter; and
a controller, connected to the AC to DC power converter, adapted to control, depending on a comparison of the measured load parameter to the preset reference condition, output by said AC to DC power converter, wherein the reference condition of at least one of the plurality of power supply apparatuses is preset to be different from remaining ones of the plurality of power supply apparatuses, and wherein the preset reference condition is a preset load efficiency of the power supply apparatus.

2. The power supply system according to claim 1, wherein the controller of each of the plurality of power supply apparatuses is adapted to independently measure the load, and to determine whether the measured load parameter satisfies the preset reference condition and control the respective AC to DC power converter to an ON state.

3. The power supply system according to claim 1, wherein the preset reference condition comprises a power output threshold value and a no-power-output threshold value,
the controller is adapted to control the AC to DC power converter into the power-output state when the measured load parameter is greater than or equal to the output threshold value, and to control the AC to DC power converter into the no-power-output state when the measured load parameter is below the no-power-output threshold value, and
the power output threshold value and the no-power-output threshold value are different from each other.

4. The power supply system according to claim 3, wherein the power output threshold value is greater than the no-power-output threshold value.

5. The power supply system according to claim 1, wherein the controller of each of the plurality of power supply apparatuses, when turning said AC to DC power converter into the no-power-output state, reduces output current of said AC to DC power converter, and turns said AC to DC power converter into the no-power-output state, after confirming that voltage supplied to the common load does not become less than or equal to a reference value or remains within a range predetermined based on the reference value.

6. The power supply system according to claim 5, wherein, when turning said AC to DC power converter into the no-power-output state, the controller of each of the plurality of power supply apparatuses turns said AC to DC power converter back into the power-output state, before voltage supplied to the common load becomes less than or equal to a reference value or goes out of a range predetermined based on the reference value.

7. The power supply system according to claim 5, wherein, when turning said AC to DC power converter into the no-power-output state, the controller of each of the plurality of power supply apparatuses turns said AC to DC power converter back into the power-output state, before an output current of others of the plurality of power supply apparatuses that are in the power-output state become greater than or equal to a reference current value or goes out of a range predetermined based on the reference current value.

8. The power supply system according to claim 1, wherein
the plurality of power supply apparatuses belong to any of a plurality of groups, and
the preset reference condition of each of the plurality of power supply apparatuses is different for those in each of the plurality of groups.

9. The power supply system according to claim 8, wherein
the reference condition memory stores a plurality of the reference conditions corresponding to the plurality of groups, and
the controller is adapted to set any of the plurality of reference conditions as the reference condition for use.

10. The power supply system according to claim 9, further comprising
a rack to contain the plurality of power supply apparatuses within a plurality of slots, and wherein
each of the plurality of slots corresponds to any one of the plurality of groups, and
the controller of each of the plurality of power supply apparatuses is adapted to detect a group corresponding to a slot containing said power supply apparatus, and the reference condition is set to correspond to the detected group.

11. The power supply system according to claim 9, wherein the reference condition is adapted to be selected by a user among the plurality of reference conditions.

12. The power supply system according to claim 9, wherein the set reference condition for use from among the plurality of reference conditions comprises a time period.

13. The power supply system according to claim 1, wherein each of the plurality of power supply apparatuses comprises a voltmeter.

14. The power supply system according to claim 13, wherein
the plurality of power supply apparatuses as a whole have output characteristics where an output voltage value is proportional to a value of the load parameter;
the voltmeter is adapted to measure an output voltage as a whole of the plurality of power supply apparatuses; and
each of the plurality of power supply apparatuses further comprises a calculator to calculate the load parameter using output voltage as a whole of the plurality of power supply apparatuses.

15. The power supply system according to claim 14, wherein the plurality of power supply apparatuses have output characteristics, which are equal among the plurality of power supply apparatuses, where an output voltage value is proportional to a value of current output rate.

16. The power supply system according to claim 14, wherein the output characteristics have characteristics such that the output voltage value gradually decreases as output current increases.

17. The power supply system according to claim 13, further comprising
a pair of signal lines which are shared with the plurality of power supply apparatuses and connected to each of the plurality of power supply apparatuses, and wherein
each of the plurality of power supply apparatuses further comprises:
a current source to output current depending on an output current of said power supply apparatus to one of the pair of signal lines;

a resistance, which is connected between the pair of signal lines, having a resistance value in inverse proportion to a rated current of said power supply apparatus;

a switch, which is connected in series to the resistance, to be turned off by the controller when said power supply apparatus is turned into the no-power-output state and to be turned on by the controller when said power supply apparatus is in the power-output state;

a voltmeter adapted to measure voltage between the pair of signal lines; and a calculator adapted to calculate the load parameter using the voltage measured between the pair of signal lines.

18. The power supply system according to claim 17, wherein one of the pair of signal lines is a power output line.

19. The power supply system according to claim 13, comprising:

a pair of signal lines which are shared with the plurality of power supply apparatuses and connected to each of the plurality of power supply apparatuses, and wherein each of the plurality of power supply apparatuses further comprises:

a voltage source to apply voltage depending on an output current of said power supply apparatus between the pair of signal lines;

a resistance having a same resistance value as other resistance values in the others of the plurality of power supply apparatuses, which is connected in series to the voltage source;

a switch, which is connected in series to the voltage source and the resistance, to be turned off by the controller when said power supply apparatus is turned into the no-power-output state, and to be turned on by the controller when said power supply apparatus is in the power-output state;

a voltmeter adapted to measure voltage between the pair of signal lines; and a calculator adapted to calculate the load parameter using the voltage measured between the pair of signal lines.

20. The power supply system according to claim 1, wherein the controller acquires a predicted value of the load parameter from a target object for power output.

21. The power supply system according to claim 20, wherein the controller modifies the reference condition when the predicted value of the load parameter exceeds a reference predicted value.

22. The power supply system according to claim 1, wherein the plurality of power supply apparatuses each are detachably attached to said power supply system in a hot-plugging manner.

23. The power supply system according to claim 1, wherein two or more power supply apparatuses in output state have load factors which are equal to each other.

* * * * *